(12) United States Patent  (10) Patent No.: US 7,696,721 B2
Young  (45) Date of Patent: Apr. 13, 2010

(54) SWITCHING METHOD AND APPARATUS FOR AC/DC POWERED CORDED/CORDLESS APPLIANCE AND RELATED APPARATUS

(75) Inventor: Jeffrey L. Young, St. Peters, MO (US)

(73) Assignee: Emerson Electric Co., St. Louis, MO (US)

( * ) Notice: Subject to any disclaimer, the term of this patent is extended or adjusted under 35 U.S.C. 154(b) by 100 days.

(21) Appl. No.: 11/557,251

(22) Filed: Nov. 7, 2006

(65) Prior Publication Data

US 2007/0103119 A1 May 10, 2007

Related U.S. Application Data

(60) Provisional application No. 60/735,008, filed on Nov. 8, 2005.

(51) Int. Cl.
*H02J 7/00* (2006.01)
*H02B 1/00* (2006.01)

(52) U.S. Cl. .................. 320/114; 320/112; 320/107; 320/113; 320/115; 361/600

(58) Field of Classification Search .............. 320/130, 320/137, 107, 112, 113, 114, 115, 125; 361/600
See application file for complete search history.

(56) References Cited

U.S. PATENT DOCUMENTS 4,591,777 A   5/1986   McCarty et al.

| | | | |
|---|---|---|---|
| 4,670,701 A | 6/1987 | Sako et al. | |
| 5,544,274 A | 8/1996 | Walker et al. | |
| 6,144,122 A | 11/2000 | Covell et al. | |
| 7,471,063 B2 * | 12/2008 | Zick et al. ................ | 320/114 |
| 2002/0149345 A1 * | 10/2002 | Takano et al. ............ | 320/137 |
| 2003/0090234 A1 * | 5/2003 | Glasgow et al. .......... | 320/107 |
| 2004/0239287 A1 * | 12/2004 | Batts-Gowins ............ | 320/103 |
| 2005/0225288 A1 * | 10/2005 | Cole et al. ................ | 320/114 |
| 2006/0006838 A1 * | 1/2006 | Clarke ...................... | 320/114 |
| 2007/0108944 A1 * | 5/2007 | Pellenc .................... | 320/130 |

OTHER PUBLICATIONS

The New Cordless Electrikbroom with 2 Motor System, article [online], downloaded from internet on Jun. 9, 2005, www.oreck.com.

(Continued)

*Primary Examiner*—Edward Tso
*Assistant Examiner*—Alexis Boateng
(74) *Attorney, Agent, or Firm*—Locke Lord Bissell & Liddell LLP

(57) ABSTRACT

The present disclosure provides a method, apparatus, and system to switch between direct current (DC) and alternating current (AC) power sources for appliances with a third position to allow on-board recharging of the DC power source. The method involves locking out a power source when the other power source is powering the appliance and locking out both power sources from operating the appliance when the appliance is being recharged. The DC power source can remain coupled to the appliance during operation and during recharging without necessitating removal for remote recharging by the use of a unique switch.

28 Claims, 3 Drawing Sheets

OTHER PUBLICATIONS

Corded Cordless Portable Vector Rechargeable Wet/Dry Canister Vacuum, article [online], downloaded from internet on Jun. 9, 2005, www.garage-toys.com.

DeWalt DC500 Multi-Volt Cordless/Corded Vac, article [online], downloaded from internet on Jun. 9, 2005, www.the-internet-eye.com.

Eurovac-A, Portable Suction Units, Suction Units Manufacturer, Portable Suction Units Manufacturer and instructions, article [online], downloaded from internet on Jun. 9, 2005, www.anandind.com.

* cited by examiner

SWITCHING METHOD AND APPARATUS FOR AC/DC POWERED CORDED/CORDLESS APPLIANCE AND RELATED APPARATUS

This application claims the benefit of U.S. Provisional Appl. No. 60/735,008, filed Nov. 8, 2005, the contents of which are hereby incorporated by reference.

FIELD

The present disclosure is related to switching between alternating current (AC) and direct current (DC) power. More particularly, the disclosure relates to switching between AC and DC in operating appliances, such as vacuum cleaners and power tools.

BACKGROUND

Portable appliances, such as vacuum cleaners and power tools, are ubiquitous to our society. The size, shape, function, and effectiveness vary considerably depending on consumer desires and pricing. What is a constant, however, is that they all require power. Generally, AC power through a power cord supplies power to a majority of appliances, such as vacuum cleaners. The typical long cord, or extension cord, plugged into an outlet must be moved and traversed and managed as the appliance is moved from area to area throughout a house, site, or other location. DC power is provided to small handheld units for more convenience in accessing remote locations.

A difficulty in DC power is that the DC power is typically provided by a battery with a necessarily limited run time. When the battery is discharged, the operation ceases unless another battery can be inserted as a replacement. Thus, a user desiring a DC powered unit has intermittent usage capabilities. AC power is generally reserved for the larger, more powerful units for effective operation.

Some current appliances have a capability of operating on a rechargeable DC battery pack or AC power. When the DC battery pack is discharged, the unit can be operated on AC power by plugging in its power cord to an AC outlet. The DC battery pack is removed from the unit to be recharged at a remote location. It does not have the capability to remain with the unit and be recharged. A user is unnecessarily inconvenienced to constantly have to remove the DC battery pack, find the charger, insert the battery pack, operate the appliance, return to the DC battery pack to determine if it has been recharged, and then reinsert a recharge DC battery pack into the appliance at a later time.

Therefore, there remains a need for a simplification and increased utility of a method and system operable from both rechargeable DC power and AC power sources.

SUMMARY

The present disclosure provides a method, apparatus, and system to switch between direct current (DC) and alternating current (AC) power sources for appliances with a third position to allow on-board recharging of the DC power source. The method involves locking out a power source when the other power source is powering the appliance and locking out both power sources from operating the appliance when the appliance is being recharged. The DC power source can remain coupled to the appliance during operation and during recharging without necessitating removal for remote recharging by the use of a unique switch.

In one embodiment, The disclosure provides a method of operating an appliance having an energy load, a rechargeable direct current (DC) power source coupled to the appliance, a charger for recharging the DC power source, and an alternating current (AC) inlet for AC power, comprising: selectively operating the appliance in a DC power mode by applying DC power to the energy load while isolating the charger from recharging the DC power source; selectively recharging the DC power source in a recharging mode while isolating the DC power and AC power from the energy load; and selectively operating the appliance in an AC power mode by applying the AC power to the energy load while isolating the charger from recharging the DC power source.

The disclosure also provides an appliance, comprising: an energy load; a rechargeable direct current (DC) power source coupled to the appliance to provide portable DC power to the appliance; an alternating current (AC) power inlet to provide AC power from a remote AC source to the appliance; a charger; and a switch coupled to the AC power inlet, the DC power source, and the charger, the switch adapted to selectively electrically couple in a first position the DC power with the energy load in a DC power mode and electrically decouple the AC power from the charger, selectively electrically couple in a second position the AC power to the charger and electrically decouple the AC power and DC power from the energy load without necessitating decoupling the DC power source from the appliance, and selectively electrically couple in a third position the AC power with the energy load in an AC power mode and electrically decouple the AC power from the charger.

BRIEF DESCRIPTION OF THE DRAWINGS

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner.

Rather, the figures and detailed written descriptions are provided to illustrate the inventive concepts to a person of ordinary skill in the art as required by 35 U.S.C. §112.

DETAILED DESCRIPTION

One or more illustrative embodiments incorporating the invention disclosed herein are presented below. Not all features of an actual implementation are described or shown in this application for the sake of clarity. It is understood that the development of an actual embodiment incorporating the present invention, numerous implementation-specific decisions must be made to achieve the developer's goals, such as compliance with system-related, business-related and other constraints, which vary by implementation and from time to time. While a developer's efforts might be complex and time-consuming, such efforts would be, nevertheless, a routine undertaking for those of ordinary skill in the art having benefit of this disclosure.

Figure 1A:
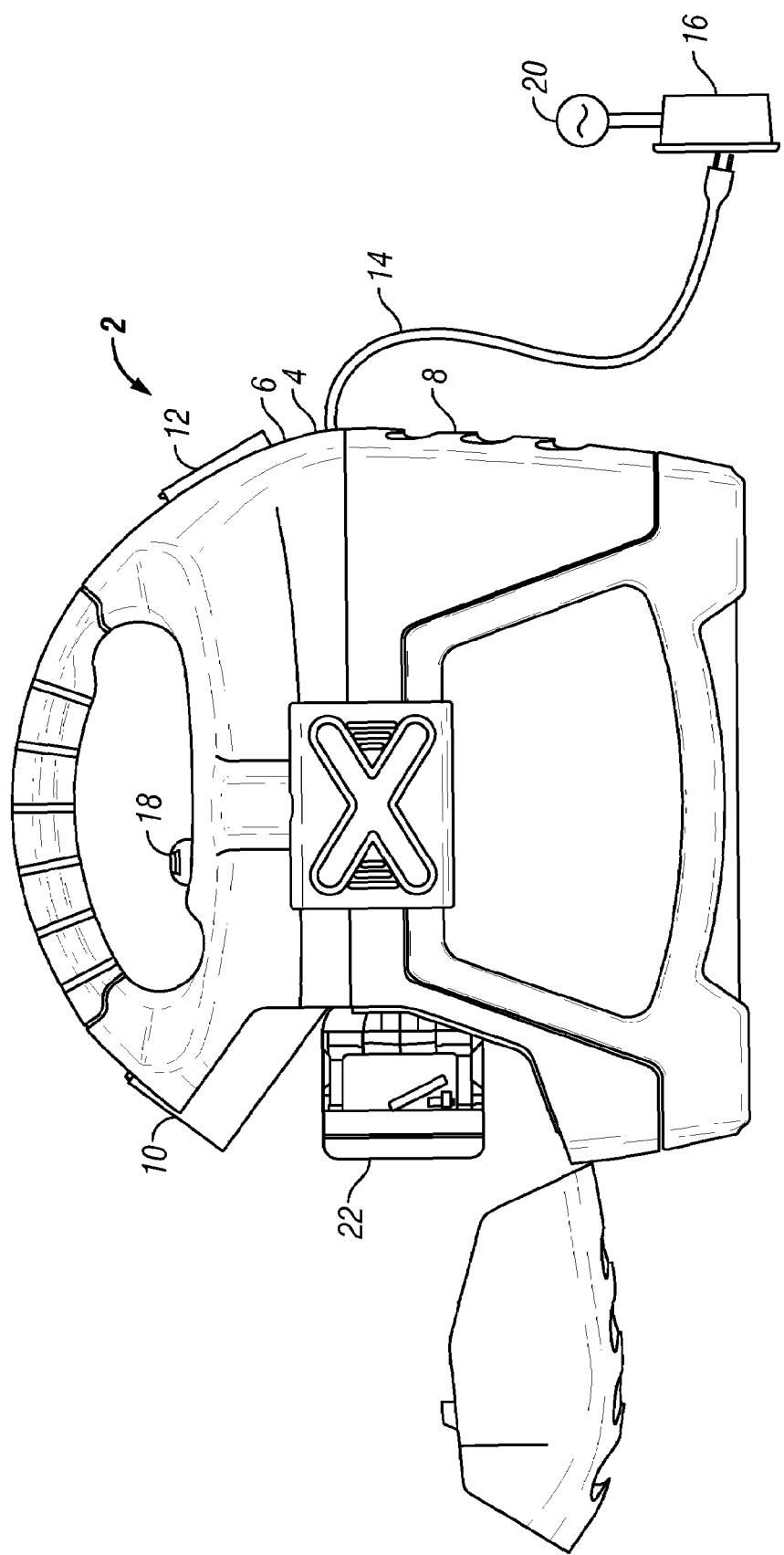
FIG. 1A is a schematic side view of a partially opened exemplary appliance with a switch for dual power sources according to the present disclosure.
Figure 1B:
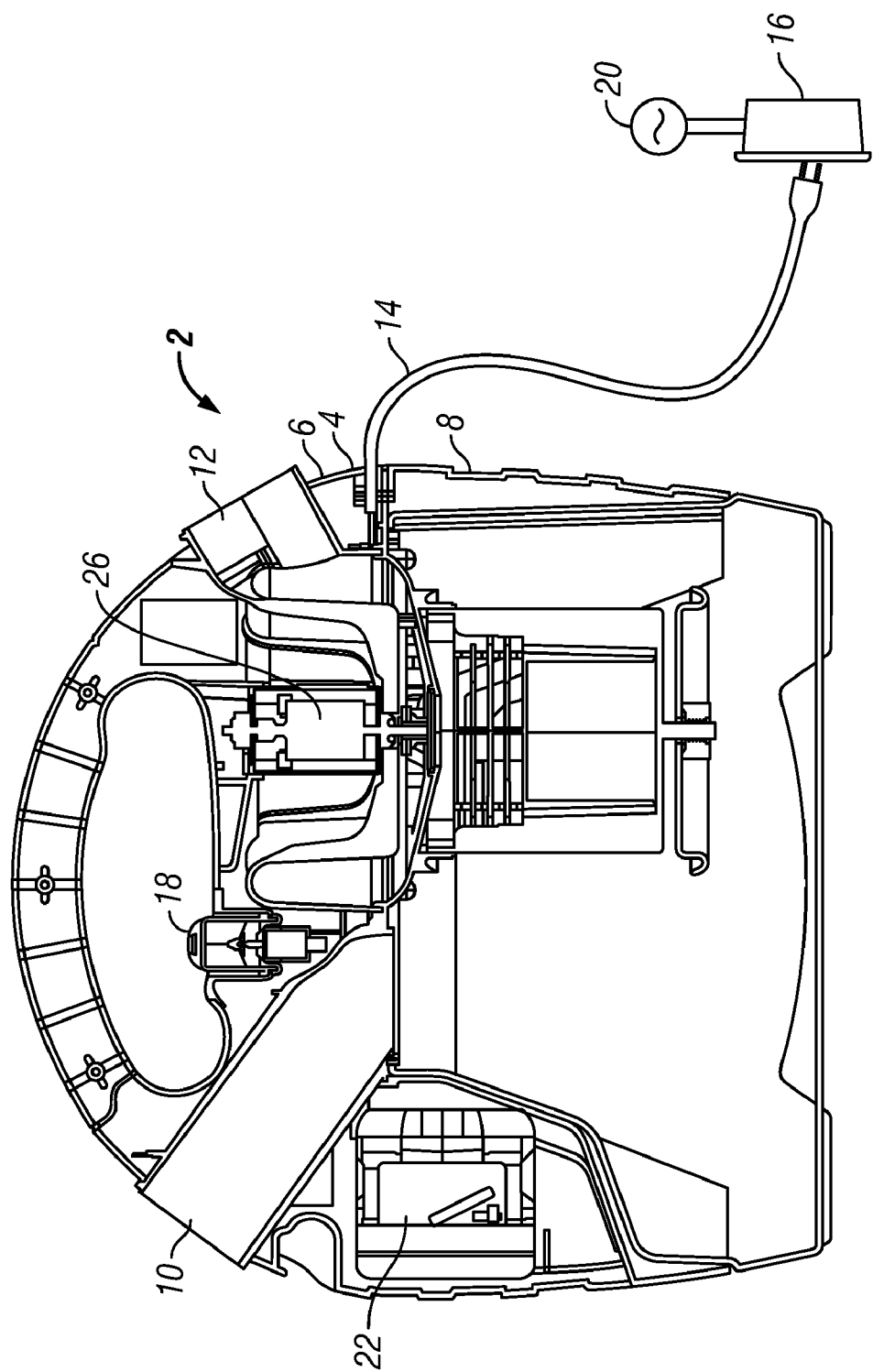
FIG. 1B is a partial cross-sectional schematic view of the exemplary appliance illustrating various internal structures.

FIG. 1A is a schematic side view of a partially opened exemplary appliance with a switch for dual power sources according to the present disclosure. FIG. 1B is a partial cross-sectional schematic view of the exemplary appliance illustrating various internal structures. The figures will be described in conjunction with each other.

The appliance 2 is represented by a wet/dry vacuum cleaner as merely one embodiment with the specific understanding that any shape, size, and function of appliance can be suitable to the methods and teachings herein. Thus, the term "appliance" is used broadly, and without limitation, includes other types of vacuum cleaners such as upright, canister, portable, handheld, industrial, or other vacuum cleaners, powered hand tools, kitchen appliances, equipment, and other devices generally designed to be operated by a user, especially those appliances that can benefit from dual power sources.

The appliance 2 can include a housing 4 with a head portion 6. The head portion generally at least partially encloses various components to perform the function for which the appliance is intended. For example, a head portion 6 of a vacuum cleaner will generally include a motor using the AC or DC power, a vacuum source actuated by the motor, a first port 10 and a second port 12 coupled to the vacuum source, and a filter. A source of AC power is provided to one or more operational components of the appliance. For example, AC power can be provided to the appliance through a power cord 14 coupled on one end to the motor and coupled on another end to an AC power outlet 16. Other sources of AC power to the components of the appliance are available and the term AC power source is used broadly to include any source of AC power that can be provided to the components of the appliance. The term "coupled," "coupling," and like terms are used broadly herein and can include any method or device for securing, binding, bonding, fastening, attaching, joining, inserting therein, forming thereon or therein, communicating, or otherwise associating, for example, mechanically, magnetically, electrically, chemically, directly or indirectly with intermediate elements, one or more pieces of members together and can further include without limitation integrally forming one functional member with another in a unity fashion.

Figure 2:
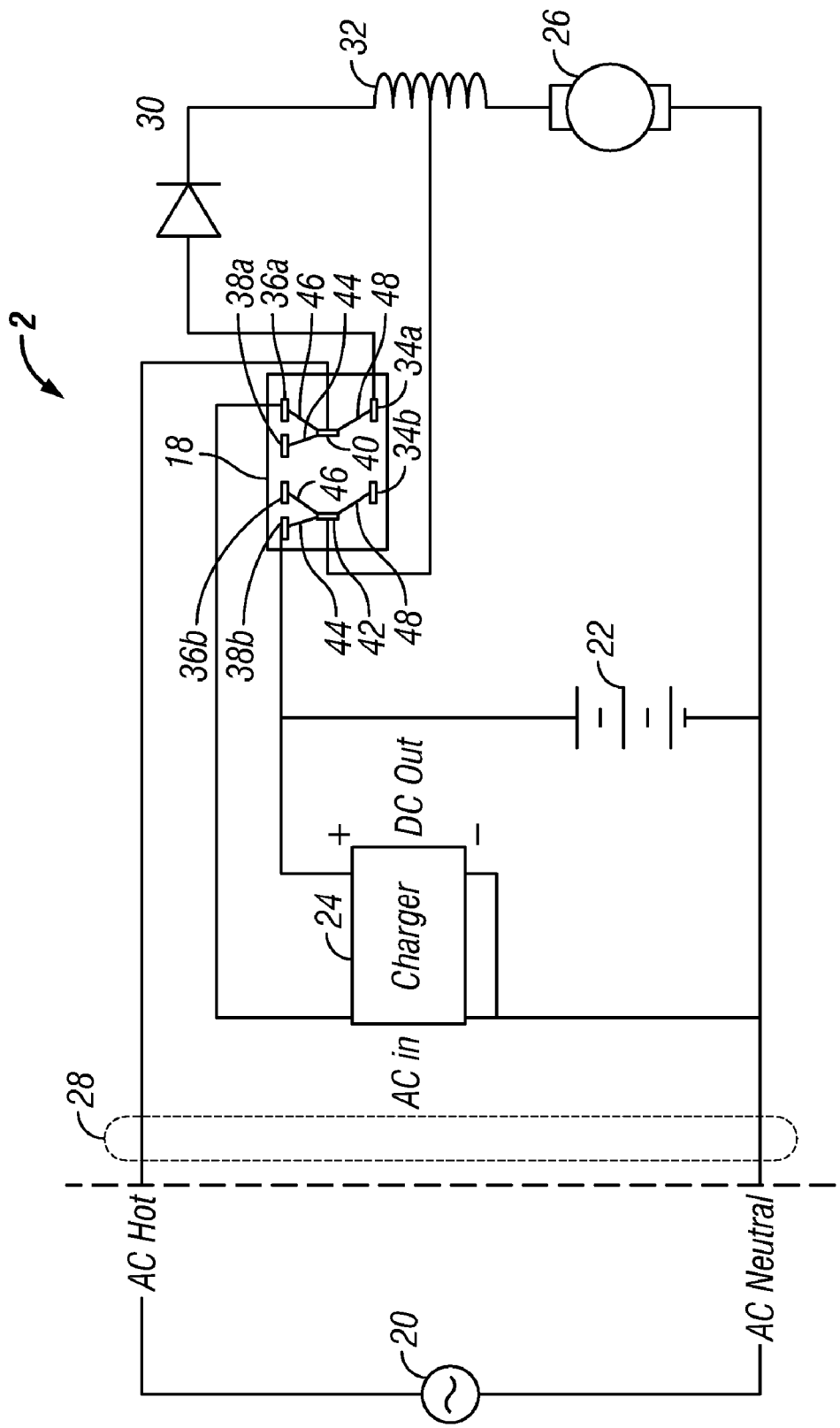
FIG. 2 is an exemplary electrical schematic according to the teachings of the disclosure.

The head portion 4 can further include a DC power source 22, such as a battery or other source for generating DC power, also shown schematically in FIG. 2, with an accompanying charger 24. The housing 4 can further include a storage portion 8 for storing debris, waste or attachments, if appropriate to the function of the appliance. A switch 18 is electrically coupled to an AC power source 20 and the DC power intermediate to an energy load 26, such as the motor. The switch 18 is described in more functional detail in reference to FIG. 2.

Advantageously, the appliance 2 does not need to have the DC power source removed and placed into a remote charger for recharging, while it continues to operate on AC power. Instead, the switch 18 uniquely interfaces with the appliance in three modes: a DC power mode for DC power operation, a recharging mode to recharge the DC power source with AC power, and an AC power mode to operate the appliance on AC power. In at least one embodiment, the DC power mode isolates the charger from recharging the DC power source with AC power during DC operation and can further isolate the AC power from operability of the appliance. The recharging mode renders both the AC power and DC power inoperative during the recharging, but is able to recharge without removing the DC power source from the appliance. The AC power mode likewise renders the charger and DC power inoperative. Further, the three modes can be selected from a single switch with a plurality of contacts.

FIG. 2 is an exemplary electrical schematic according to the teachings of the disclosure. The appliance 2 can coupled to an AC power source 20 through an AC power inlet 28 to provide AC power to the appliance. A DC power source 22 can be coupled to the appliance, physically and electrically. The DC power source can be any source of stored DC power, such as and without limitation batteries of various types including wet dry, and gel cell types. Any suitable voltage can be used, including without limitation standard 18 volts and newer 24 volt and 48 volt DC power sources, and other lower and higher voltages. A charger 24 is physically coupled to the appliance and is generally electrically coupled to the DC power source and intermittently electrically coupled to the AC power inlet and the AC power source, depending on the mode of operation. An energy load 26 is physically coupled to the appliance and can be electrically coupled to one or more of the power sources depending on the mode of operation. For example and without limitation, the energy load 26 can include active energy loads, such as motors, and passive energy loads, such as resistive elements including light filaments and heating elements. In at least one exemplary embodiment, the appliance can be a vacuum cleaner and the energy load can include a motor, such as a tapped field dual voltage vacuum motor. The power provided to the energy load can be modified depending on the particular requirement of the energy load. A power converter 30 can modify the power into other forms. For example, a power converter 30 that includes a rectifier can modify AC sinusoidal power into DC power. Similarly, a power converter that includes an inverter can modify DC power into AC power. An optional field winding 32 is illustrated in the diagram although it is generally understood to be physically existent within the casing of a motor. The field winding allows variations in voltage levels to actuate the motor at different speeds.

A switch 18 modifies the electrical coupling in the system between the various components depending on the selected mode of operation. In general, the switch includes a plurality of contacts. The switch generally includes an AC power inlet contact 40 and a DC output contact 42 insulated from each other. Depending on the position of the switch and other connections, the AC and/or DC power is transferred throughout the appliance in the different modes. Advantageously, in at least one embodiment, a single switch can provide coupling between multiple contacts to actuate the different modes of operation. In the exemplary embodiment, a contact 34a can be coupled to an AC power output of the switch to the energy load 26, and a contact 34b may not be coupled to an input or output of the switch. A contact 36a can be coupled to an AC power output from the switch to the charger 24, and a contact 36b may not be coupled to an input or output of the switch. A contact 38a likewise may not be coupled to an input or output of the switch, and a contact 38b can be coupled to the DC power source 22 and optionally the charger 24.

The switch 18 can be actuated to three positions for the three different modes described herein. The term "position" is used broadly and is intended to indicate different actuation modes regardless of the actual method the switch is placed in the different modes, whether the switch is moved rotationally or translationally, activated by signals or other outside input without physical movement, simply pressed multiple times, or other forms of actuation.

When the switch 18 is in a first position 44, the switch completes an electrical coupling between the contact 38b and the DC outlet contact 42 to allow DC power to the energy load 26 in a DC power mode. The switch in the first position 44 can decouple the AC inlet contact 40 from the contact 36*a*, so that AC power is not provided to the charger 24 in the DC power mode. The switch can complete the electrical coupling between the AC inlet contact 40 and the contact 38*a*, but unless the contact 38*a* is coupled to additional components, no further results are obtained. The switch can also decouple the AC power from the energy load 26 by not switching to the contact 34*a* in the first position.

When the switch 18 is in a second position 46, the switch can complete an electrical coupling between the contact 36*a* and the AC inlet contact 40 to allow AC power to the charger 24 in a recharging mode. The switch in the second position 46 can also decouple the DC power from the DC outlet contact 42 by switching from the contact 38*b* to the contact 36*b*. Unless the contact 36*b* is coupled to additional components, no further results are obtained. In at least one embodiment, the DC power source can remain electrically coupled to the charger in the different switch positions/operational modes.

When the switch 18 is in a third position 48, the switch completes an electrical coupling between the AC inlet contact 40 and the contact 34*a* to allow AC power to the energy load 26 in an AC power mode. The switch in the third position 48 can decouple the charger 24 from the AC power in the second position by switching from the contact 36*a* to the contact 34*a*. Further, the switch in the third position can maintain the decoupling of the DC power from the energy load 26, existing in the recharging mode, by switching from the contact 36*b* to the contact 34*b*. Unless the contact 34*b* is coupled to additional components, no further results are obtained.

The various steps described or claimed herein can be combined with other steps, can occur in a variety of sequences unless otherwise specifically limited, various steps can be interlineated with the stated steps, and the stated steps can be split into multiple steps. Unless the context requires otherwise, the word "comprise" or variations such as "comprises" or "comprising", should be understood to imply the inclusion of at least the stated element or step or group of elements or steps or equivalents thereof, and not the exclusion of any other element or step or group of elements or steps or equivalents thereof. Also, any directions such as "top," "bottom," "left," "right," "upper," "lower," and other directions and orientations are described herein for clarity in reference to the figures and are not to be limiting of the actual device or system or use of the device or system. The device or system may be used in a number of directions and orientations.

The invention has been described in the context of preferred and other embodiments and not every embodiment of the invention has been described. Apparent modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intends to protect all such modifications and improvements to the full extent that such falls within the scope or range of equivalent of the following claims.

Further, any documents to which reference is made in the application for this patent as well as all references listed in any list of references filed with the application are hereby incorporated by reference. However, to the extent statements might be considered inconsistent with the patenting of this invention such statements are expressly not to be considered as made by the applicant(s).

The invention claimed is:

1. A method of operating an appliance having an energy load, a rechargeable direct current (DC) power source coupled to the appliance, a charger for recharging the DC power source, and an alternating current (AC) power inlet for AC power, and a single switch coupled to the DC power source, the AC power inlet, and the charger, the method comprising:
   selectively operating the appliance in a DC power mode by applying DC power from the DC power source to the energy load while isolating the charger from recharging the DC power source;
   selectively recharging the DC power source in a recharging mode while isolating the DC power source and AC power from the energy load; and
   selectively operating the appliance in an AC power mode by applying the AC power to the energy load while isolating the charger from recharging the DC power source.

2. The method of claim 1, further comprising isolating the DC power from the energy load in the AC power mode.

3. The method of claim 1, further comprising isolating the AC power from the energy load in the DC power mode.

4. The method of claim 1, further comprising operating a motor as at least a portion of the energy load.

5. The method of claim 1, further comprising operating a passive resistive element as at least a portion of the energy load.

6. The method of claim 1, further comprising converting the AC power or the DC power into another form of power.

7. The method of claim 6, further comprising rectifying the AC power to a DC power prior to applying power to the energy load.

8. The method of claim 6, further comprising inverting the DC power to an AC power prior to applying power to the energy load.

9. The method of claim 1, wherein operating the appliance comprises operating a vacuum cleaner.

10. An appliance, comprising:
    an energy load;
    a rechargeable direct current (DC) power source coupled to the appliance to provide portable DC power to the appliance;
    an alternating current (AC) power inlet to provide AC power from a remote AC source to the appliance;
    a charger; and
    a switch coupled to the AC power inlet, the DC power source, and the charger, the switch adapted to
       selectively electrically couple in a first position the rechargeable DC power source with the energy load in a DC power mode and electrically decouple the AC power inlet from the charger,
       selectively electrically couple in a second position the AC power inlet to the charger and electrically decouple the AC power and rechargeable DC power source from the energy load without necessitating decoupling the rechargeable DC power source from the appliance, and
       selectively electrically couple in a third position the AC power inlet with the energy load in an AC power mode and electrically decouple the AC power inlet from the charger.

11. The appliance of claim 10, wherein the DC power source is coupled to the charger in each of the three positions of the switch.

12. The appliance of claim 10, wherein the energy load comprises a motor.

13. The appliance of claim 10, wherein the energy load comprises a passive resistive element.

14. The appliance of claim 10, further comprising a power converter adapted to modify the AC power or DC power prior to the energy load.

15. The appliance of claim 14, further comprising a rectifier electrically coupled to the AC power and adapted to rectify the AC power into DC power prior to the energy load.

16. The appliance of claim 14, further comprising an inverter electrically coupled to the DC power and adapted to invert the DC power into AC power prior to the energy load.

17. The appliance of claim 10, wherein the switch in the first position is further adapted to selectively electrically decouple the DC power from the energy load.

18. The appliance of claim 10, wherein the switch in the second position is further adapted to selectively electrically decouple the AC power from the energy load.

19. The appliance of claim 10, wherein the appliance comprises a vacuum cleaner.

20. An appliance, comprising:
   an energy load;
   a rechargeable direct current (DC) power source coupled to the appliance to provide portable DC power to the appliance;
   an alternating current (AC) power inlet to provide AC power from a remote AC source to the appliance;
   a charger; and
   a switch adapted to
      in a first position, electrically communicate the DC power from the DC power source to the energy load,
      in a second position, electrically communicate the AC power from the AC power inlet to the charger and,
      in a third position, electrically communicate the AC power from the AC power inlet to the energy load.

21. The appliance of claim 20, wherein, in the first position, the switch also electrically decouples the AC power from the charger.

22. The appliance of claim 20, wherein, in the second position, the switch also electrically decouples the AC power inlet and DC power source from the energy load.

23. The appliance of claim 20, wherein the DC power source remains directly coupled with the appliance throughout each of the selective functionality.

24. The appliance of claim 20, wherein, in the third position, the switch also electrically decouples electrically decouple the AC power inlet from the charger.

25. The appliance of claim 20, wherein the switch passes the AC power from the AC power inlet toward the energy load, when in the third position, with both the DC power source and the charger decoupled from both the AC power inlet and the energy load.

26. The appliance of claim 20, wherein a single housing at least partially encloses the energy load, the DC power source, the AC power inlet, the charger, and the switch.

27. The appliance of claim 20, wherein the switch is operated by a user of the appliance.

28. The method of claim 1, wherein the selective choosing of each of the three modes is performed by user operation of the single switch.

* * * * *